United States Patent [19]
Bardas et al.

[11] Patent Number: 5,095,237
[45] Date of Patent: Mar. 10, 1992

[54] SECTORAL CORE FOR MAGNETIC BEARING

[75] Inventors: Theodor Bardas; Gordon Brailean; Timothy A. Harris, all of Calgary; Vaclav Kulle, Blind Bay; Cal Oleksuk, Calgary, all of Canada

[73] Assignee: Nova Corporation of Alberta, Calgary, Canada

[21] Appl. No.: 639,349

[22] Filed: Jan. 10, 1991

Related U.S. Application Data

[63] Continuation-in-part of Ser. No. 495,943, Mar. 20, 1990, abandoned.

[51] Int. Cl.$^5$ .................. F16C 32/04; H02K 1/14
[52] U.S. Cl. ..................... 310/90.5; 310/254; 310/186
[58] Field of Search ......... 310/90.5, 254, 67 R, 310/185, 186, 188, 208, 216, 217

[56] References Cited

U.S. PATENT DOCUMENTS

| | | | |
|---|---|---|---|
| 1,255,607 | 2/1918 | Hensley | 310/217 |
| 4,255,684 | 3/1981 | Mischler et al. | 310/216 |
| 4,403,401 | 9/1983 | Rosenberry | 310/216 |
| 4,549,104 | 10/1985 | Niimura et al. | 310/67 R |
| 4,804,873 | 2/1989 | Shiraki et al. | 310/67 R |

FOREIGN PATENT DOCUMENTS

| | | | |
|---|---|---|---|
| 223203 | 6/1985 | Fed. Rep. of Germany | 310/90.5 |
| 58-34226 | 2/1983 | Japan | 310/90.5 |
| 175314 | 8/1986 | Japan | 310/90.5 |

Primary Examiner—Steven L. Stephan
Assistant Examiner—D. L. Rebsch
Attorney, Agent, or Firm—Stevens, Davis, Miller & Mosher

[57] ABSTRACT

A rotary electrical machine comprises a rotor assembly and a stator assembly separated by an air gap. The stator is formed from discrete generally pie-shaped pole pieces having a progressively increasing radial slot to accommodate winding of the coil. The pole pieces are preferably wound from a grain oriented ferromagnetic tape to improve the permeability of the pole and its saturation level. Groups of poles may be separated into sectors. In an alternative embodiment, at least some of the pole pieces are formed from both a permanent magnet and ferromagnetic tape to provide a constant bias between the rotor and stator assemblies.

17 Claims, 4 Drawing Sheets

SECTORAL CORE FOR MAGNETIC BEARING

This application is a continuation-in-part of application Ser. No. 495,943 filed on Mar. 20, 1990, now abandoned.

The present invention relates to rotary magnetic bearings and in particular to the construction and method of constructing the magnetic core of such machines.

Rotary electrical machines such as motors, generators and magnetic bearings include a stationary component known as a stator and a rotating component known as a rotor that are separated by an air gap. One of these components, normally the stator, is formed from a number of pole pieces each of which has an electrical coil wound about it to generate a magnetic field that passes between the stator and rotor. The characteristics of the machine are determined in part by the configuration of the magnetic core.

In the case of magnetic bearings, the magnetic field produced between the stator and the rotor is used to support a shaft and permit it to rotate under load without additional mechanical support. These bearings have highly desirable characteristics compared to other types of bearings but one of their major limitations is the lower specific load capacity of the magnetic bearings. The specific load capacity is the load supported per unit area of bearing surface and the lower specific load capacity associated with magnetic bearings requires the bearing surface to be physically larger.

This restricts the applications in which such bearings can be used.

The magnetic field that supports the rotating shaft in a magnetic bearing or induces electromotive force in motors and generators must traverse the air gap between the stator and the rotor. The ease with which magnetic fields can pass through material is referred to as the material's permeability and it is common practice to specify magnetic permeability as relative permeability rather than absolute permeability. As a reference, the magnetic permeability of air is assigned the relative permeability value of 1 and by comparison, metals considered to be magnetic have relative permeabilities typically of 2,000 or more. For a given geometry and magnetic field density between the rotor and a stator, the magnetizing force required to produce the magnetic field in air would be at least 2,000 times as large as that required to produce the same magnetic field in a magnetic metal. Thus, for a given magnetomotive force, by minimizing the air gap between the rotor and the stator, the flux density in the air gap is increased so that one can increase the force exerted by the magnetic bearing. However, because of the allowable radial excursions of the rotor relative to the stator and the manufacturing and assembly tolerances for the components, the air gap must have a finite minimum thickness.

The specific load capacity of the bearing might also be increased by maximizing the pole area at the air gap so that the amount of magnetic material around the stator and thus the average flux density is maximized.

Conventional pole pieces are formed from laminations of magnetic material stacked along the longitudinal axis of the machine to the required thickness. The use of the laminations assists in control of eddy currents induced in the core by the varying magnetic fields produced by variations in the current in the coil. The laminations are slotted to define the pole pieces and accomodate the coils wound around the pole pieces. These coils may be slid onto the pole pieces after the laminations are assembled into the magnetic core. However, the spacing between the pole pieces tends to be controlled by the thickness of the coils wound around the pole pieces. A reduction in the size of the coil leads to a corresponding reduction in the magnetizing force and so it is necessary to compromise between the required coil size and the required pole area. In the design of pole pieces, it is desirable to maximize the permeability of the material of the pole pieces to reduce the resistance to flow of the magnetic flux and also to utilize a material that has a high saturation limit, i.e. it requires high flux densities to saturate the material. Grain orientated ferromagnetic materials exhibit both properties but because multiple pole pieces are integrally formed on each lamination and the grain structure may only run in one direction, it is inevitable that certain of the pole pieces will have a grain structure that is opposite to that required. Again, therefore, a compromise has to be reached in the materials selected for the magnetic core.

In U.S. Pat. No. 1,255,607 to Hensley, there is disclosed a motor having a magnetic core with pole pieces formed from individual laminations. Coils are wound about limbs of the pole pieces but the coils and pole pieces are interconnected to provide a uniform field in the stator. Moreover, there is a relatively large spacing of the limbs about the rotor to accomodate intermediate coils that renders the device shown generally unsuitable for use in the environment envisaged by the present invention.

It is therefore an object of the present invention to provide a magnetic bearing machine in which the above disadvantages are obviated or mitigated.

Preferably the slot progressively increases in width in a radial direction away from the peripheral surface and accomodates a coil wound about abutting limbs of adjacent pole pieces in the respective sector.

As a further preference, the pole pieces are formed from laminations which extend along the limbs between the poles and abutting faces of the laminations lie in planes generally parallel to the axis of rotation. This permits the poles to be wound from a length of ferromagnetic tape with an oriented grain structure.

According also to the present invention, there is provided a rotary electrical machine comprising a rotor assembly secured to and rotating with rotating components of said machine and a stator assembly secured to stationery components of said machine, said assemblies having opposed peripheral surfaces separated by an air gap, one of said assemblies comprising a plurality of pole pieces arranged in seriation about the axis of rotation of said machine, each of which terminates in a pole at the respective peripheral surface, at least one of said pole pieces being formed at least in part from laminations, extending between said poles with abutting faces of said laminations lying in planes generally parallel to the axis of rotation of said rotating assembly, said pole pieces being pie-shaped with a correspondingly-shaped radial slot between said limbs, said slot extending to said peripheral surface to define a discontinuity therein to separate said poles, at least one pair of abutting limbs being encompassed by a coil formed from multiple turns of a conductor arranged in layers, said turns being located in the radial slots of each of said pair of pole pieces and said layers having a cumulative thickness greater than the discontinuity between said limbs.

According to a further aspect of the present invention, there is provided a method of forming a pole piece of a rotary electrical machine comprising the step of wrapping about a mandrel a tape of oriented ferromagnetic material to provide a body having multiple laminations of said tape, securing the ends of said tape to the body, and removing a portion of said body to provide a discontinuity in the body.

Preferably the mandrel is generally triangular and, as a further preference the portion removed is the apex of the triangular body formed about the mandrel.

The provision of the pole pieces formed from laminations of oriented ferromagnetic tape permits a high permeability pole piece to be obtained in a simple yet effective manner.

Embodiments of the invention will now be described by way of example only with reference to the accompanying drawings in which FIG. 1 is a sectional view of a magnetic bearing;

Figure 1:
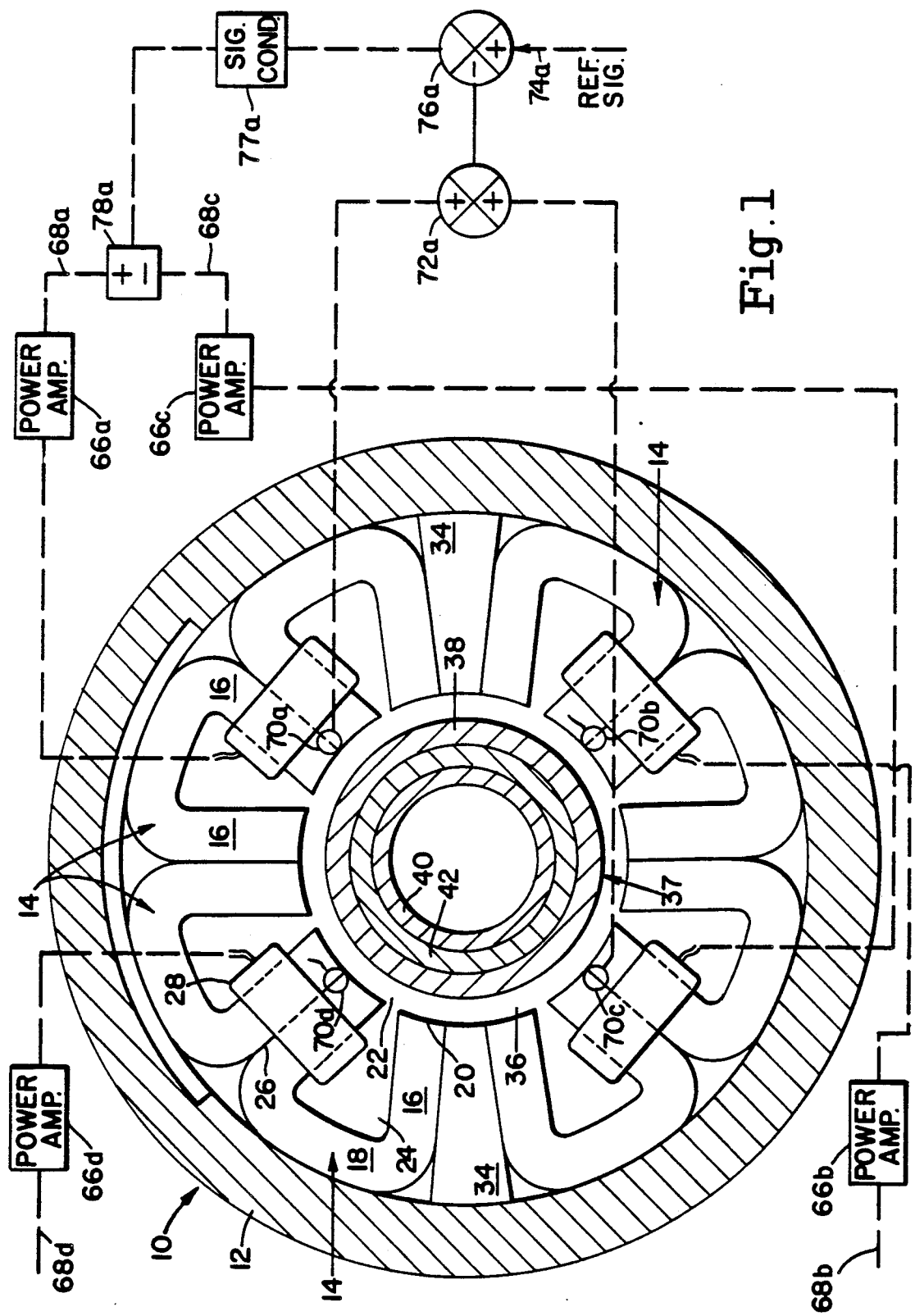
Figure 2:
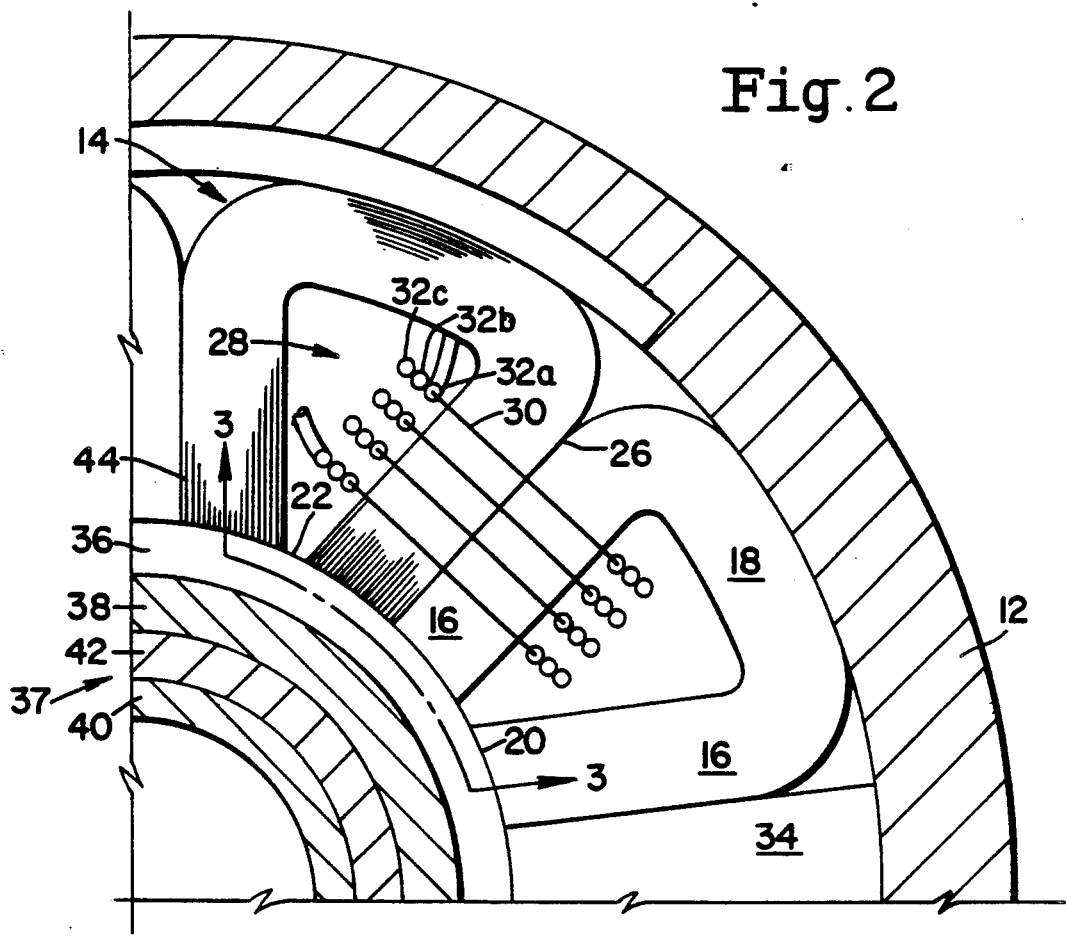
FIG. 2 is an enlarged view of a portion of the bearing shown in FIG. 1.
Figure 3:
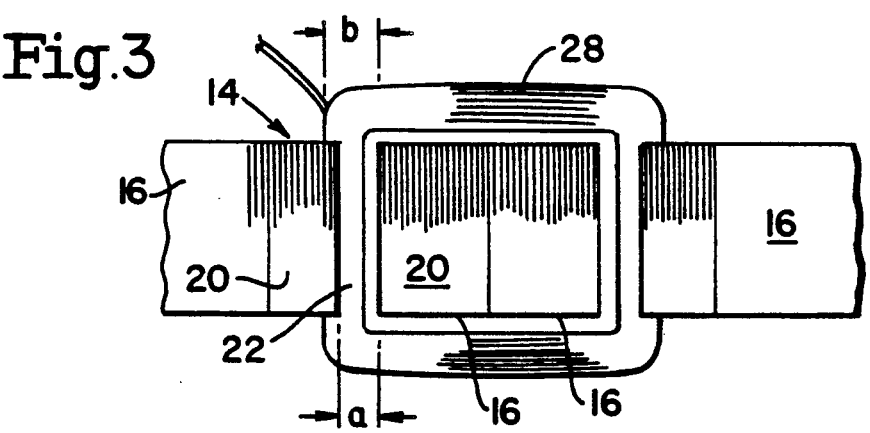
FIG. 3 is a view on the line 3—3 of FIG. 2.

Referring to FIGS. 1-3, a magnetic bearing 10 includes a generally cylindrical housing 12 formed from a non-magnetic material such as stainless steel within which a plurality of pole pieces 14 are arranged in series about the circumference of the housing 12. The pole pieces 14 are each formed as a discrete unit and each includes a pair of radially extending limbs 16 interconnected by a bridging portion 18. The radially inner end of the pole piece 16 terminates in an arcuate surface 20 which defines a pole of the pole piece and is separated from the adjacent pole of the same pole piece by a discontinuity 22. As can best be seen in FIG. 3, the discontinuity extends axially across the entire width of the pole piece 14.

The pole pieces 14 are generally pie-shaped so that the limbs 16 diverge and define between them and the connecting portion 18 a triangular slot 24 that extends radially from the discontinuity 22. The radial disposition of the limbs 16 permits adjacent pole pieces to be nested about the circumference of the housing 12 with outer faces 26 of each limb abutting the corresponding outer face of the adjacent pole piece. A coil 28 encompasses abutting limbs 16 of selected ones of adjacent pole pieces 14 and, as may be seen more fully in FIG. 2, each coil consists of multiple turns of a conductor 30 arranged in layers indicated at 32a,32b,32c to supply the required magnetizing field.

The pole pieces 14 are divided into upper and lower sets separated by wedge-shaped inserts 34 located at diametrically-opposed positions in the housing 12. The inserts 34 are utilized as magnetic barriers to control stray flux paths as disclosed more fully in our co-pending application entitled "Flux Control Techniques for Magnetic Bearings" and filed on Mar. 20, 1990, the contents of which are incorporated herein by reference.

The housing 12, pole pieces 14 and coils 28 constitute the stator of the magnetic bearing, with the surface 20 presenting a radially inner cicumferential surface interrupted by the discontinuities 22. Separated from the surface by an air gap 36 is a rotor assembly 37 comprising a radially outer surface of a laminated sleeve 38 rotatable with a shaft 40. The shaft 40 is separated from the sleeve 38 by a magnetic insulating layer 42 to inhibit the flow of magnetic flux into the shaft 40.

The shaft 40 rotates within and is supported by the stator with the radial position of the shaft 40 being controlled by the magnetic flux flowing through the pole pieces 14 and generated by the coils 28. As may be seen from FIG. 1, the pole pieces 14 are segregated into control sectors as indicated by chain dot lines, with each sector containing an integral number of pole pieces, two in this particular embodiment. A coil 28 is associated with each sector and receives electrical current through conductors 30. It will be noted that the coil 28 is located within each sector so that only the pole pieces in that sector are influenced by that coil. Thus the pairs of abutting limbs that delimit respective sectors are not encompassed by a coil.

Each conductor 30 is connected to a respective power amplifier 66a-66d which controls the current supplied to the respective coil 28. The output of the power amplifiers 66a-66d is regulated by a respective control signal 68a-68d. In the embodiment shown, the coils 28 in opposed sectors are arranged to operate in a complementary fashion so that an increase in force in one sector is accompanied by a corresponding reduction in force in the diametrically opposed sector. The position of rotor 37 relative to the desired axis of rotation is monitored by position sensors 70a-70d. The outputs of opposite pairs of sensors, e.g. 70a,70c are summed at summing junction 72a and compared to a reference signal 74a at comparator 76a. The resulting signal is conditioned by signal conditioner 77a to compensate for non-linearities and the like and the conditioned signal applied to a signal distributor 78a. The distributor 78a generates the control signals 68a-68c to respective power amps 66a,66c and ensures that complementary adjustment of the current supply to the coils 28 is provided. It will be appreciated that similar signal processing is provided for the position sensors 70b,70d to control their respective power amps 66b,66d.

Of course, in the situation where three sectors are provided, complimentary adjustment of the coils will not be possible and the control logic will be implemented in a different manner to allow individual control of the coils 28 in each sector. Similarly, in some cases, the current supply to one sector is maintained at a nominal level and the current to an opposed coil will be modulated. This arrangement is beneficial where the rotational axis of the shaft is horizontal and the current to the coils of the lower sectors is maintained at a nominal value. In some cases, the bearing could be used to control movement along only one radial axis in which case only two sectors need be provided.

In operation, therefore, deviations of the rotor from the desired axis are detected and the current supplied to the coil 28 in the appropriate sector is varied. By varying the current supplied to the coils 28, the magnetic flux may also be varied to maintain the position of the shaft 40 at a desired datum.

As may best be seen in FIG. 3, the circumferential width of the discontinuity 22 as indicated by "a" in FIG. 3 is less than the combined thickness of the layers 32, indicated by "b" in FIG. 3, forming the coil 28. However, the divergent configuration of the pole pieces 14 accomodates the thickness of the layers 32 to avoid undue restriction of the number of turns of the conductor available to provide the coil. The circumferential width "a" of the discontinuity 22 is chosen to be sufficient to offer a significant magnetic resistance to the flux in the limbs 16 and cause the flux to flow across the air gap 36 and into the rotor 37. This is typically less than the combined thickness "b" of the layers 32. In order to fabricate the coil 28, the conductor 30 is passed axially through the slots 24 after the pole pieces 14 have been assembled into the housing 12. The conductor 30 is then wound about selected ones of the abutting pole pieces 16 to form in situ the coil 28. Accordingly, the pole area of the stator is maximized without undue restriction being placed on the coil configuration.

To improve the permeability of the pole pieces 14, and as indicated in FIG. 2, the pole pieces are formed from laminations 44 that extend between the poles at the surface 20. The laminations 44 are formed from individual layers of ferromagnetic tape having an orientated grain structure extending between the poles. Such a tape is commercially available under the trade name SILECTRON from ARNOLD ENGINEERING. The laminations 44 abut with adjacent laminations along planes lying parallel to the axis of rotation of the shaft 40 within the housing 12. Adjacent laminations are interconnected and insulated from one another by an epoxy varnish.

The use of the tape allows the grain structure in the laminations to follow the magnetic flux path between the poles and provide a uniform cross-sectional area for the poles. Likewise, the individual fabrication of pole pieces 14 permits each of the pole pieces to exhibit maximum permeability in the direction of the flux path flowing in the pole piece.

The use of the grain oriented tape provides pole pieces with enhanced magnetic properties, i.e. high permeability and saturation limits in an economical manner.

For certain applications, only selected ones of the pole pieces may require these enhanced characteristics allowing other pole pieces to be formed from more economical tape, such as that known as Super Mendur, or alternative non-oriented materials. The discrete nature of the pole pieces permits the selective assembly of the pole pieces of difference characteristics. For applications where the required rate of change of flux is low, i.e. in low speed applications, the laminations could be eliminated.

Figure 4A:
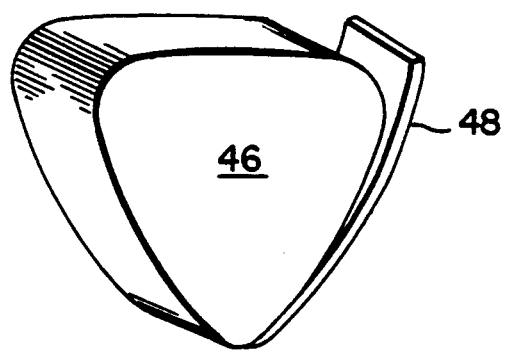
FIG. 4 is a diagrammatic representation of the method of forming one of the components shown in FIG. 1.
Figure 4B:
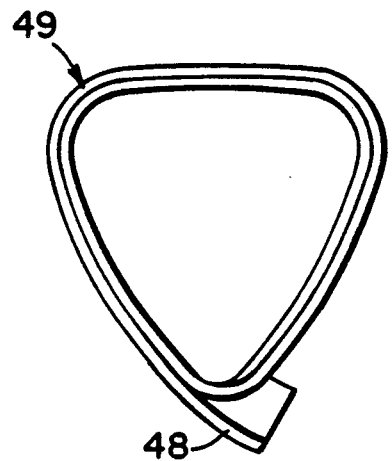
Figure 4C:
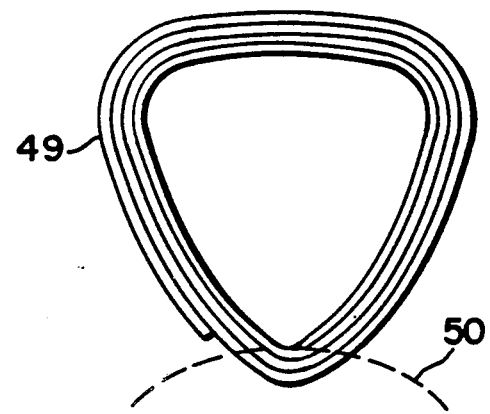

The pole pieces 14 are readily formed in the manner schematically shown in FIGS. 4a, 4b and 4c. With this arrangement, a mandrel 46 is used that has a shape corresponding to the shape of the slot 24. A tape 48 is wound about the periphery of the mandrel 46 to form a body of successive layers of the tape 48 until the desired number of laminations have been formed. The mandrel 46 is then removed to provide a generally triangular body 49. A portion of the body 49 is then removed as indicated by the chain dot line 50 in FIG. 4c adjacent one apex of the body 49. The cut line 50 is positioned so as to intersect the inner periphery of the body 49 and define the discontinuity 22 of the pole piece 14. The cut line 50 is arcuate to define the arcuate surfaces 20 corresponding to the desired curvature of the peripheral surface.

In operation, therefore, current is supplied to the coils 28 which generates a magnetic flux extending through the limb 16, across the air gap 36 and through the sleeve 38 to flow along the adjacent limb 16. Control of the current controls the magnetic flux and therefore the force exerted on the shaft 40 associated with the sleeve 38 to inhibit movement of the shaft 40 away from the desired axis of rotation. The absolute position of the shaft 40 can be monitored and the current to each of the coils 28 adjusted to ensure the shaft 40 is returned to the required datum.

By providing the generally pie-shaped pole pieces 14, a compact configuration of pole pieces 14 is achieved while providing the radial slot 24 to accomodate the multiple layers of coil 28 without introducing restrictions in the magnetic flux path. At the same time, the discontinuity 22 may be maintained relatively small, increasing the pole area of the pole pieces. Similarly, the configuration of the pole pieces permits the high permeability material high saturation limit to be utilized in the pole piece 14 to increase its permeability and further enhance the magnetic flux available for supporting the shaft 40.

The configuration of the pole pieces also facilitates the provision of independently adjustable coils in each sector so that the flux in one sector may be adjusted independently of the flux in adjacent sectors. The orientation of the laminations further inhibits migration of the stray flux between adjacent sectors.

Figure 5:
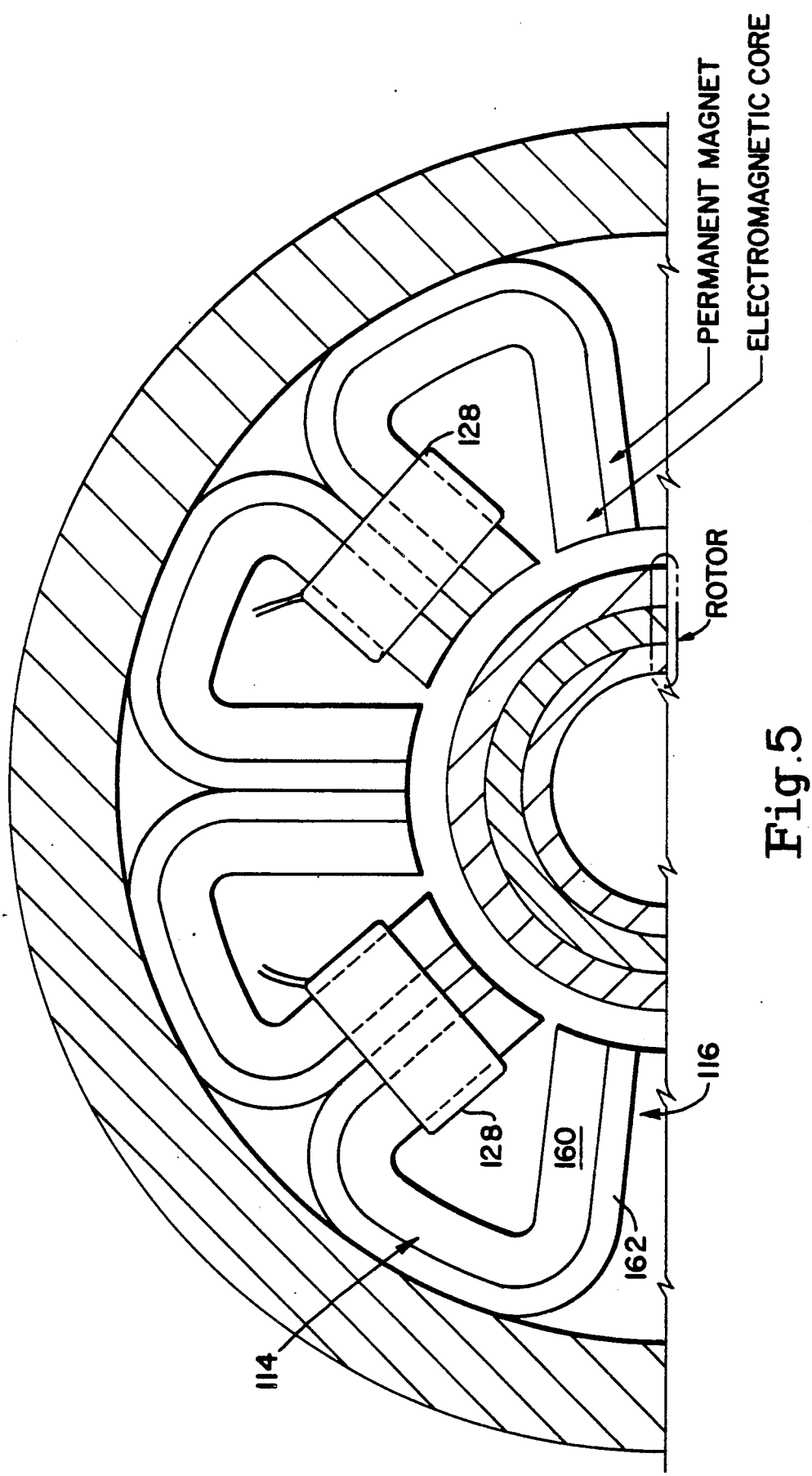
FIG. 5 is a view similar to FIG. 1 of an alternative embodiment of a magnetic bearing.

An alternative embodiment of a magnetic bearing is shown in FIG. 5 and like reference numerals will be used to identify like components to the embodiments of FIGS. 1 to 4 with a prefix "1" added for clarity of description.

Referring therefore to FIG. 5, pole pieces 114 located above the axis of rotation to the rotor 137 are each formed in two sections 160, 162. The outer section 160 is formed from a permanently magnetized material and the inner section 162 formed from a ferromagnetic tape in the manner described with respect to the embodiment of FIGS. 1 to 4. Coils 128 extend about selected pairs of limbs 116 to generate flux in the inner section 162 in the same sense as the permanent magnet.

The forces acting on the rotor 137 therefore comprise a substantially constant bias from the permanent magnet and a fluctuating force from the electromagnet as the current supplied to the coils 128 is varied. This effect is particularly beneficial where rotors have a predominant force in one direction, such as in a machine with a horizontal shaft. In this case, the weight of the shaft is supported by the permanent magnet and electromagnetic cores are only utilized to modulate disturbances of the rotor. If these disturbances are appreciably smaller than the steady force, the size of the electromagnetic core and the coil 128 can be greatly reduced. This has the potential to save space in the slot areas and reduce the power consumption and therefore heat generation in the electromagnetic coil.

Of course, the composite pole pieces shown in FIG. 5 could be utilized in all of the pole pieces if desired, for example, to obtain a minimum initial stiffness for the bearing or might be used in only one of the pole pieces for a specific purpose.

The pole pieces 116 are formed by initially manufacturing the inner section 162 from tape in the manner described with respect to FIG. 4 and subsequently bonding the outer section 160 to the inner section 162. Alternatively, the permanent magnet could constitute the inner section 162 and act as a mandrel for the formation of the outer section 160.

While the embodiments have been described with respect to a magnetic bearing, it will be appreciated that the invention may be used with other forms of electrical machines having a magnetic core such as a motor or generator.

We claim:

1. A radial magnetic bearing comprising a rotor assembly secured to and rotating with rotating components of said bearing and a stator assembly secured to stationary components of said bearing, said assemblies having opposed peripheral surfaces separated by an air gap with said stator assembly comprising a plurality of pole pieces arranged in seriatim about the axis of rotation of said machine, each pole piece being formed as a discrete unit and having a pair of circumferentially spaced limbs, each of which terminates in a pole at the respective peripheral surface, said limbs being separated by a radial slot extending from an axially extending discontinuity in the peripheral surface that separates the poles and having a portion of greater circumferential width than said discontinuity, said pole pieces being segregated into at least two sectors, each containing an integral number of pole pieces, each sector having means associated therewith for generating and adjusting the magnetic flux in the pole pieces of its respective sector independently of the adjacent sectors and thereby adjusting the force exerted by the respective sector on said rotor assembly.

2. A magnetic bearing according to claim 1 wherein each of said generation and adjustment means includes a coil means and current supply means, said coil means encompassing at least a portion of each pole piece in the respective sector.

3. A bearing according to claim 2 wherein said slot progressively increases in width in a radial direction away from said peripheral surface.

4. A bearing according to claim 3 wherein said limbs converge toward said peripheral surface.

5. A bearing according to claim 4 wherein said pole pieces are pie-shaped and limbs of adjacent pole pieces abut.

6. A bearing according to claim 5 wherein said coil means includes a coil encompassing abutting limbs of adjacent pole pieces in the respective sector.

7. A bearing according to claim 6 wherein each sector is delimited by a pole piece having a limb abutting a limb of a pole piece of an adjacent sector, said coil encompassing the other limb of said pole piece.

8. A bearing according to claim 1 wherein at least a portion of at least one of said pole pieces is formed from laminations extending between said poles and abutting faces of said laminations lie in planes generally parallel to the axis of rotation.

9. A bearing according to claim 8 wherein said laminations are lengths of ferromagnetic tape with an oriented grain structure.

10. A bearing according to claim 9 wherein each of said pole pieces are pie-shaped and said limbs are interconnected by a circumferentially extending connecting portion.

11. A bearing according to claim 10 wherein said limbs and connecting portion have a substantially uniform cross-section.

12. A bearing according to claim 11 wherein limbs of adjacent pole pieces in each sector abut.

13. A bearing according to claim 12 wherein said coil means includes a coil encompassing abutting pairs of limbs of adjacent pole pieces in the respective sector.

14. A bearing according to claim 9 wherein at least one of said pole pieces is formed entirely from said laminations.

15. A bearing according to claim 1 wherein at least one of said pole pieces is formed in part from a permanently magnetized material.

16. A bearing according to claim 8 wherein selected ones of said pole pieces are formed at least in part from material exhibiting enhanced magnetic characteristics relative to the other of said pole pieces.

17. A rotary electrical machine comprising a rotor assembly secured to and rotating with rotating components of said machine and a stator assembly secured to stationary components of said machine, said assemblies having opposed peripheral surfaces separated by an air gap, said stator assembly comprising a plurality of pole pieces arranged in seriatim about the axis of rotation of said machine, each pole piece having a pair of spaced limbs each of which terminates in a pole at the respective peripheral surface, at least one of said pole pieces being formed at least in part from laminations extending between said poles with abutting faces of said laminations being in planes generally parallel to the axis of rotation of said rotating assembly, said pole pieces being pie-shaped with a correspondingly-shaped radial slot between said limbs, said slot extending to said peripheral surface to define a discontinuity therein to separate said poles, at least one pair of abutting limbs being encompassed by a coil formed from multiple turns of a conductor arranged in layers, said turns being located in the radial slots of each of said pair of pole pieces and said layers having a cumulative thickness greater than the discontinuity between said limbs.

* * * * *